(12) United States Patent
Criel et al.

(10) Patent No.: US 11,072,235 B2
(45) Date of Patent: Jul. 27, 2021

(54) VEHICLE FUEL SYSTEM WITH VAPOUR CONTROL

(71) Applicant: Plastic Omnium Advanced Innovation and Research, Brussels (BE)

(72) Inventors: Bjorn Criel, Sint-Martens-Lennik (BE); David Hill, Commerce Township, MI (US); Dominique Madoux, Rumes (BE); Antoine Chaussinand, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/611,146

(22) PCT Filed: Jun. 7, 2018

(86) PCT No.: PCT/EP2018/064967
§ 371 (c)(1),
(2) Date: Nov. 5, 2019

(87) PCT Pub. No.: WO2018/224577
PCT Pub. Date: Dec. 13, 2018

(65) Prior Publication Data
US 2020/0094672 A1 Mar. 26, 2020

(30) Foreign Application Priority Data
Jun. 9, 2017 (EP) ..................... 17175270

(51) Int. Cl.
*B60K 15/035* (2006.01)
*F02D 41/00* (2006.01)
(Continued)

(52) U.S. Cl.
CPC .. *B60K 15/03504* (2013.01); *B60K 15/03519* (2013.01); *B67D 7/048* (2013.01);
(Continued)

(58) Field of Classification Search
CPC ............. F02M 25/089; F02M 25/0836; F02M 25/0818; F02M 25/0809; B60K 15/03504;
(Continued)

(56) References Cited

U.S. PATENT DOCUMENTS 6,283,097 B1    9/2001   Cook et al.
6,301,955 B1 * 10/2001   Cook ................. F02M 25/0818
                                                                     73/114.39

(Continued)

FOREIGN PATENT DOCUMENTS

DE   11 2015 004 005 T5   5/2017
EP        2 823 981 A1     1/2015

OTHER PUBLICATIONS

International Search Report dated Sep. 21, 2018 in PCT/EP2018/064967 filed on Jun. 7, 2018.

(Continued)

*Primary Examiner* — Atif H Chaudry
(74) *Attorney, Agent, or Firm* — Oblon, McClelland, Maier & Neustadt, L.L.P.

(57) ABSTRACT

A module (49, 149, 249) for use in a vehicle fuel system, said module comprising a housing (7) having a first port (9), a second port (41) and a passage (57) between the first port and the second port; a closure body (11) that is moveably arranged in said housing; wherein said closure body is configured for closing the passage between the first port and the second port in a first position of the closure body and for allowing access to the passage in a second position of the closure body; and a pump (13) that is integrated in said housing (7), wherein said pump (13) communicates with the first port (9) and is configured for pumping fluid into or out of the first port (9) while the closure body (11) is in the first position, characterized in that the module (49, 149) further comprises a motor (15) and a closure body actuator (67) configured for positioning the closure body (11, 111) in at (Continued)

least the first position and the second position, wherein said closure body actuator is driven by said motor (15), and said motor is configured for driving the pump (13) while the closure body is in the first position.

19 Claims, 5 Drawing Sheets

(51) Int. Cl.
    *F02M 25/08*     (2006.01)
    *B67D 7/04*     (2010.01)

(52) U.S. Cl.
    CPC ......... *B67D 7/0476* (2013.01); *F02D 41/004* (2013.01); *F02M 25/0809* (2013.01); *B60K 2015/03514* (2013.01); *Y10T 137/86171* (2015.04)

(58) Field of Classification Search
    CPC .... B60K 15/03519; B60K 2015/03514; B60K 2015/03243; B60K 2015/03509; F02D 41/004; F02D 2041/225; B67D 7/0476; B67D 7/048; Y10T 137/86171
    See application file for complete search history.

(56) References Cited

U.S. PATENT DOCUMENTS

| | | | | |
|---|---|---|---|---|
| 7,231,813 | B2* | 6/2007 | Kato | .................. F02M 25/0836 |
| | | | | 73/40.5 R |
| 9,464,600 | B2* | 10/2016 | Yasuzaka | ............ F04C 29/0071 |
| 2005/0022588 | A1 | 2/2005 | Hayakawa et al. | |
| 2006/0191330 | A1 | 8/2006 | Hayakawa et al. | |
| 2012/0047999 | A1* | 3/2012 | Itoh | ....................... F04C 18/344 |
| | | | | 73/40 |
| 2015/0096355 | A1 | 4/2015 | Makino et al. | |
| 2016/0368371 | A1 | 12/2016 | Hill et al. | |
| 2017/0305266 | A1 | 10/2017 | Kimoto et al. | |

OTHER PUBLICATIONS

International Preliminary Report on Patentability and Written Opinion dated Dec. 10, 2019 in PCT/EP2018/064967, 7 pages.

\* cited by examiner

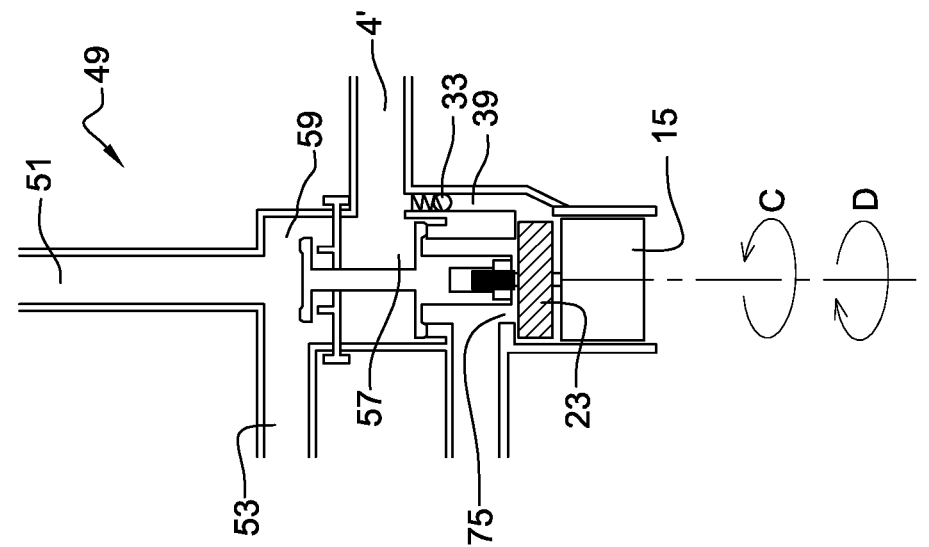
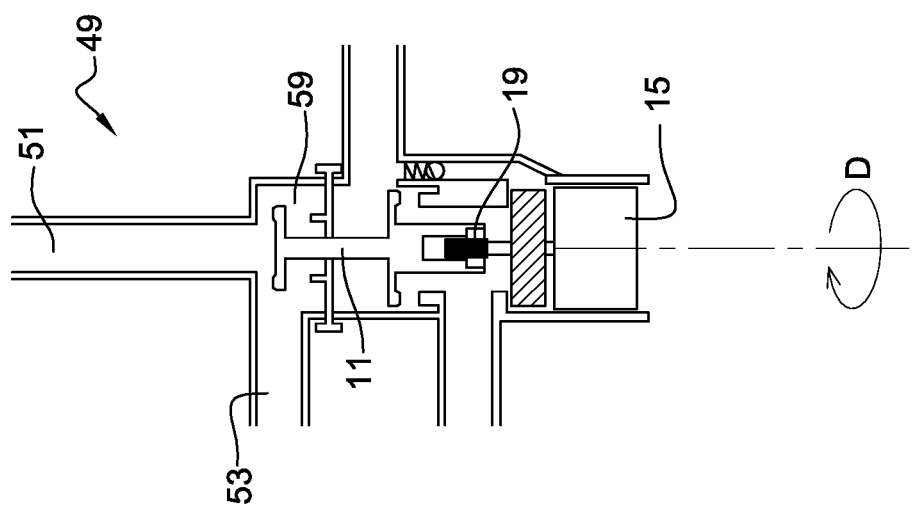
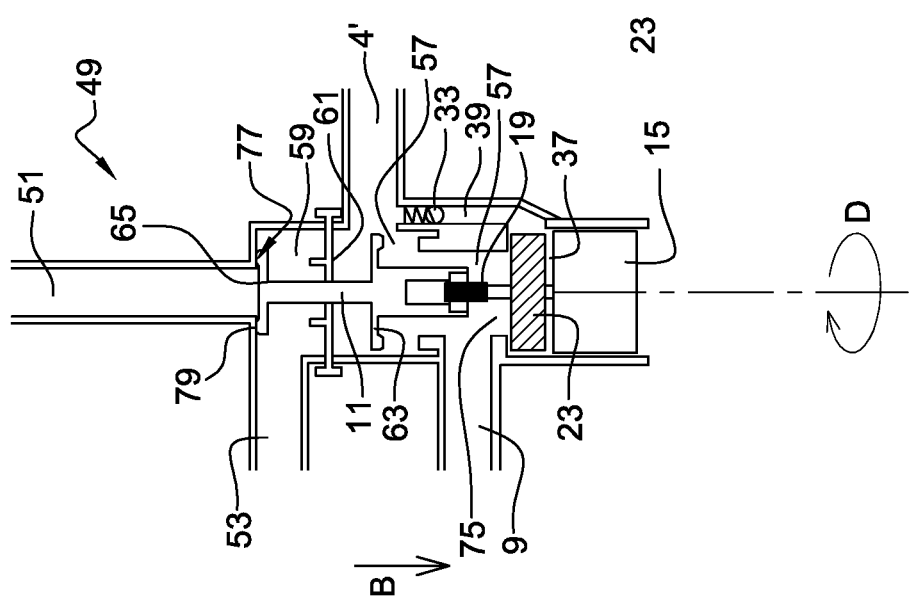

VEHICLE FUEL SYSTEM WITH VAPOUR CONTROL

TECHNICAL FIELD

The invention relates to the field of vehicle fuel systems with vapour control, and to modules for use in such systems. More generally, the invention relates to the field of conventional vehicles and hybrid vehicles.

BACKGROUND

Vehicle fuel systems may be used to store and provide fuel to engines. For example, an automotive vehicle including an internal combustion engine may be provided with a vehicle fuel system including vehicle fuel tank that stores liquid fuels such as gasoline, diesel, methanol, ethanol, and/or other fuels. Liquid fuels in a vehicle fuel tank may evaporate into volatile fuel vapour in the vehicle fuel tank. Vehicle fuel systems are generally provided with a vapour outlet for venting fuel vapour from the fuel system. The emission of fuel vapours to the atmosphere contributes to vehicle emissions. To control the emission of volatile fuel vapours, vehicle fuel systems are typically provided with evaporative emission control, herein referred to as vapour control, for controlling the emission of volatile fuel vapour.

Vapour control vehicle fuel systems typically include a module, referred to as an isolation valve module, that communicates with a vapour outlet of the vehicle fuel system and that allows for selectively opening and closing the vapour outlet. Such a module provides the vehicle fuel system with control over the venting of fuel vapour from the vehicle fuel system and thus control over the emission of fuel vapour from the vehicle fuel system into the atmosphere. A leak in the vehicle fuel system may result in fuel vapour escaping into the atmosphere. In order to prevent such uncontrolled emission of fuel vapour from the vehicle fuel system into the atmosphere, it is known to provide vehicle fuel systems with a fuel system leak detection function. A known approach to perform leak detection consists in depressurizing the fuel system by means of a leak detection pump after closing the isolation valve, and subsequently measuring pressure changes over a time period. In prior art vehicle fuel systems, typically there is required an isolation valve module and a leak detection pump module to perform the fuel system leak detection function.

SUMMARY

The object of embodiments of the invention is to provide a vehicle fuel system with vapour control, which is more compact, and reduces the number of required components.

According to a first aspect of the invention a vehicle fuel system comprises a vapour outlet; a housing having a first port that communicates with the vapour outlet, a second port that communicates with the atmosphere, and a passage between the first port, and the second port; a closure body that is moveably arranged in said housing; and a pump that is integrated in said housing. The closure body is configured for closing the passage between the first port and the second port in a fuel system isolation position of the closure body and for allowing access to the passage in a fuel system venting position of the closure body. The pump is configured for pressurizing or depressurizing the vehicle fuel system via the vapour outlet while the closure body is in its fuel system isolation position.

Embodiments of the invention are based inter alia on the inventive insight that a leak detection pump function and an isolation valve function can be combined in a single module by arranging a pump of a leak detection module and a closure body of an isolation valve module in a single housing. Combining a pump for providing a leak detection pump function and a closure body for providing an isolation valve function in a single housing as an integrated module has the advantage of being more compact than prior art vehicle fuel systems, as described herein above, that require an isolation valve module and a separate leak detection pump module to perform the fuel system leak detection function. Furthermore, combining the pump and the closure body in a single housing has the advantage of requiring fewer components.

Advantageous embodiments of the invention are disclosed in the dependent claims.

In a preferred embodiment the vehicle fuel system comprises a motor and an closure body actuator configured for positioning the closure body in at least the fuel system isolation position and the fuel system venting position, wherein said closure body actuator is driven by a motor, said motor being configured for driving the pump while the closure body is in its fuel system isolation position. This preferred embodiment of the invention is based inter alia on the inventive insight that a single motor can be used for driving both the closure body actuator and the pump. More in particular, the inventors have realised that the closure body actuator and the pump do not need to be driven at the same time, and that it is possible to drive the closure body actuator and the pump with a single motor with a specially adapted module including a closure body and a pump being arranged in a single housing.

In an exemplary embodiment the motor is a rotary motor, preferably a stepper motor.

In an exemplary embodiment the pump is a rotary pump. In an advantageous embodiment thereof, the pump is a direct displacement pump, preferably a vane pump.

In an exemplary embodiment wherein the pump is a rotary pump, the pump comprises a rotary driven pump member that is directly driven by the motor. In an advantageous embodiment thereof, the rotary driven pump member is arranged on a rotary output shaft of the rotary motor.

In an exemplary embodiment wherein the motor is a rotary motor, the closure body is guided in the housing for being translated between the fuel system venting position and the fuel system isolation position, and the closure body actuator is configured to convert a rotational motion generated by the rotary motor in a linear motion for translating the closure body. In a preferred embodiment the closure body actuator comprises a screw mechanism for converting the rotational motion generated by the rotary motor in the linear motion.

As an alternative for the embodiment wherein the closure body being guided in the housing for being translated between the fuel system venting position and the fuel system isolation position, an embodiment may include a closure body that is rotatable mounted in the housing, wherein the closure body actuator is configured for rotating the closure body between the fuel system venting position and the fuel system isolation position.

In an exemplary embodiment wherein a motor drives the closure body actuator and the pump, the closure body actuator comprises a clutch configured for connecting the motor to and disconnecting the motor from the closure body. In a preferred embodiment the clutch is a torque overload clutch. In combination with the closure body actuator comprising a screw mechanism, the screw mechanism advantageously provides the torque overload clutch. In a preferred embodiment, the screw mechanism comprises a screw member driven by the motor and a nut member provided on the closure body, wherein the screw mechanism is configured such that in the fuel system isolation position of the closure body an end of a screw thread of the nut member is at an end of a screw thread of the screw member such that rotation of the screw member in a first direction of rotation relative to the nut member results in the screw thread of the nut member being disconnected from the screw thread of the screw member and rotation of the screw member in a second direction of rotation relative to the nut member results in the screw thread of the nut member being connected to the screw thread of the screw member. In an advantageous embodiment thereof a resilient seal member is provided on the housing or the closure body that is compressed between the housing and the closure body when the closure body is in the fuel system isolation position and the screw member is rotated in the first direction of rotation. This advantageous feature helps the screw threads of the screw member and the nut member to re-engage when after disconnection the screw member is rotated in opposite direction of the first direction of rotation relative to the nut member.

In an exemplary embodiment wherein a clutch is provided that is configured for connecting the motor to and disconnecting the motor from the closure body, the vehicle fuel system comprises a controller configured for controlling the clutch such that the motor and the closure body are disconnected when the closure body is in its fuel system isolation position and the pump is driven. In an exemplary embodiment thereof, the controller is configured to determine when the closure body is in its fuel system isolation position. In an embodiment, for determining when the closure body is in its fuel system isolation position, the controller is provided with a position sensor configured for measuring the position of the closure body. Alternatively, or additionally, for determining when the closure body is in its fuel system isolation position the controller is provided with a speed sensor configured for measuring the rotational speed of the rotary motion generated by the motor.

In an exemplary embodiment wherein a motor drives the closure body actuator and the pump, the vehicle fuel system comprises a controller that is configured to control the motor, wherein the controller is configured to control the motor to generate a rotational motion at a first power level when the closure body is moved between the fuel system venting position and the fuel system isolation position and at a second power level for driving the pump while the closure body is in the fuel system isolation position.

In an exemplary embodiment the pump comprises a driven pump member and a one way pump valve. In a preferred embodiment thereof the housing comprises a bypass that communicates with the first port and the second port and that bypasses the closure body, wherein the bypass communicates with the pump member and is provided with the one way pump valve. In a further advantageous embodiment the bypass comprises a pump chamber having arranged therein the driven pump member, and a bypass channel having arranged therein the one way pump valve.

In an exemplary embodiment, the vehicle fuel system comprises a vehicle tank having a tank vapour outlet, and a vapour recovery system having a vapour recovery inlet and a vapour recovery outlet. For such a system, the housing preferably has a third port that communicates with the tank vapour outlet; a fourth port that communicates with the vapour recovery inlet; and a second passage between the third port and the fourth port; wherein the vapour recovery outlet is in communication with the first port as the fuel system vapour outlet, wherein the closure body is configured for closing the second passage between the third port and the fourth port in a vehicle tank isolation position of the closure body and for allowing access to the second passage between the third port and the fourth port in the fuel system venting position of the closure body. In an exemplary embodiment the vapour recovery system comprises a filter unit having a filter inlet and a filter outlet. The filter is preferably an evaporation canister.

The present invention also relates to a module for use in a vehicle fuel system, in particular for use in a vehicle fuel system of the invention as described herein above. The module of the invention comprises a housing having a first port; a second port; and a passage between the first port and the second port; a closure body that is moveably arranged in said housing; and a pump that is integrated in said housing. The closure body is configured for closing the passage between the first port and the second port in a first position of the closure body and for allowing access to the passage in a second position of the closure body. The pump communicates with the first port and is configured for pumping fluid into or out of the first port while the closure body is in the first position.

In a preferred embodiment of the module, the module further comprises a motor and a closure body actuator configured for positioning the closure body in at least the first and the second position, wherein said closure body actuator is driven by said motor, and said motor is configured for driving the pump while the closure body is in the first position.

In an alternative embodiment of the module, the module further comprises a closure body actuator configured for positioning the closure body in at least the first position and the second position, wherein said closure body actuator is driven by a first motor, said module further comprising a second motor for driving the pump.

In an exemplary embodiment of the module, the housing has a third port; a fourth port; and a second passage between the third port and the fourth port; wherein the closure body is configured for closing the second passage between the third port and the fourth port in a third position of the closure body and for allowing access to the second passage between the third port and the fourth port in the first position of the closure body.

The present invention also relates to the use of a module of the invention as described herein above in a vehicle fuel system.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 4, 5, and 6, illustrate schematically the module of FIGS. 1, 2, and 3, wherein the closure body is located in a first, a second, and a third position, respectively;

DESCRIPTION OF EMBODIMENTS

Figure 1:
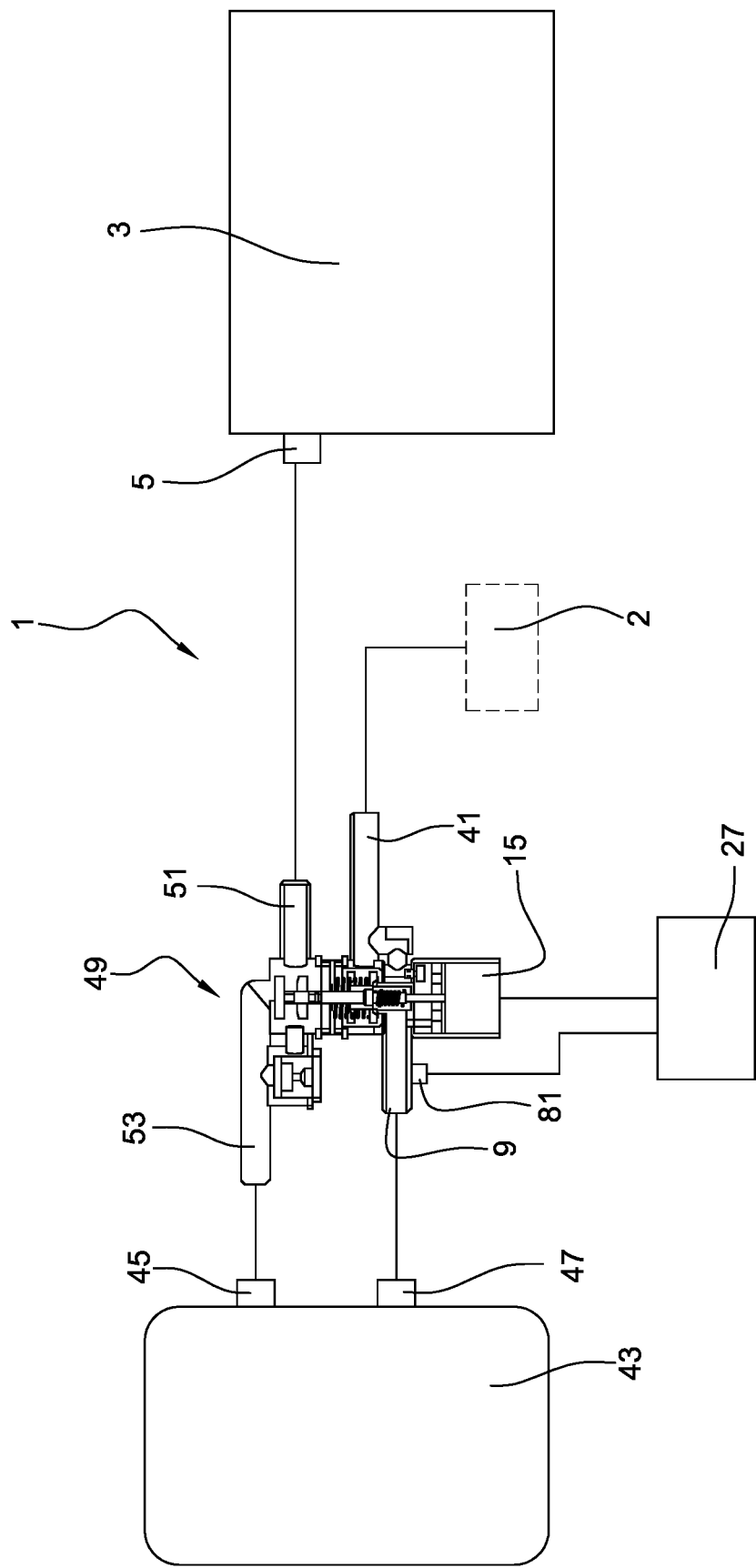
FIG. 1 illustrates schematically a first embodiment of a vehicle fuel system of the invention including a first embodiment of a module of the invention for use in a vehicle fuel system.

FIG. 1 illustrates a vehicle fuel system 1. The vehicle fuel system 1 comprises a vehicle tank 3, a vapour recovery system, embodied by a filter unit 43, and a module 49. The vehicle tank 3 is in particular a fuel tank. The filter unit 43 is in particular an evaporation canister.

The module 49 comprises a housing 7 having a first port 9 and a second port 41. The housing 7 additionally has a third port 51 and a fourth port 53. The first port 9 communicates with a vapour recovery outlet that is embodied by filter outlet 47 of the filter unit 43. The second port 41 communicates with the atmosphere 2. The third port 51 communicates with a tank vapour outlet 5 of the vehicle tank 3. The fourth port 53 communicates with a vapour recovery inlet that is embodied by filter inlet 45.

Figure 2:
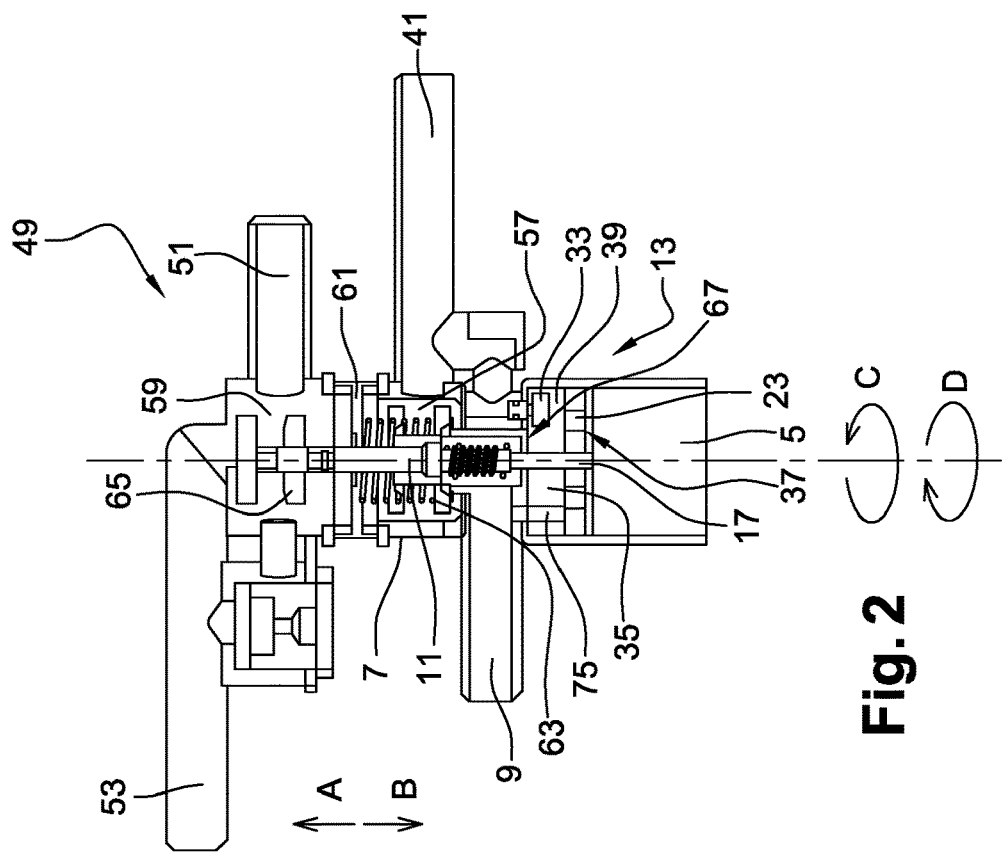
FIG. 2 illustrates schematically the module of FIG. 1.

FIG. 2 particularly illustrates that the housing 7 has a first passage 57 between the first port 9 and the second port 41. Furthermore, the housing 7 has a second passage 59 between the third port 51 and the fourth port 53. The first passage 57 and the second passage 59 are separated by a separation wall 61. The module 49 and the filter unit 43 provide a vapour venting path from the interior of the vehicle tank 3 to the atmosphere 2. The venting path from the interior of the vehicle tank 3 to the atmosphere 2 in particular runs from the interior of the vehicle tank 3 via tank vapour outlet 5, third port 51, second passage 59, fourth port 53, filter inlet 45, filter outlet 47, first port 9, first passage 57, and second port 41 to the atmosphere. The filter outlet 47 embodies a vapour outlet of the vehicle fuel system 1.

FIG. 2 illustrates that the module 49 comprises a closure body 11 that is moveable arranged in said housing 7. The closure body 11 has a first closure member 63 that is arranged in the first passage 57. The closure body 11 has a second closure member 65 that is arranges in the second passage 59. The closure body 11 extends through the separation wall 61. The closure body 11 is guided in the housing 7 for being translated in the directions indicated by arrows A and B. For translating the closure body 11, the module 49 is provided with a rotary motor 15 and a closure body actuator 67. The closure body actuator 67 is configured to convert a rotational motion of a rotary output shaft 17 of the rotary motor 15 in the directions indicated by arrows C and D in a linear motion for translating the closure body 11 in the directions indicated by arrows A and B. The motor 15 is preferably a stepper motor.

Figure 3:
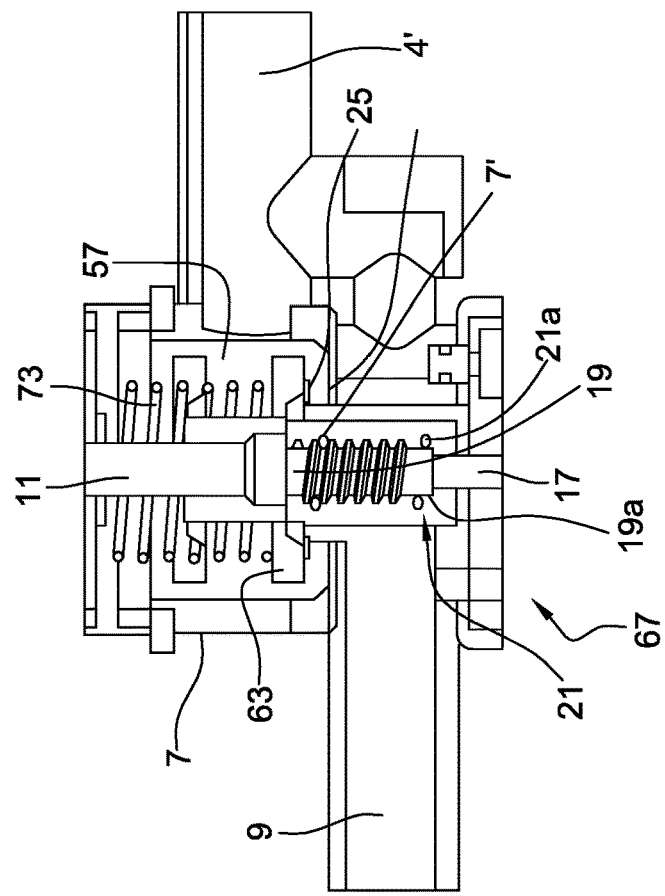
FIG. 3 illustrates schematically a portion of the module of FIG. 2.

In particular FIG. 3 illustrates that for converting the rotational motion generated by the rotary motor 15 in the linear motion the closure body actuator 67 comprises a screw mechanism. The screw mechanism comprises a screw member 19 that is driven by the motor 15 by being fixed to the rotary output shaft 17. The screw mechanism further comprises a nut member 21 provided on the closure body 11 that cooperates with the screw member 19. In particular the nut member 21 is provided with a screw thread 21a that is engages by a screw thread 19a of the screw member 19. In FIG. 3, the closure body 11 is in a first position, wherein the first closure member 63 is arranged against a seat 71. In the shown position the first closure member 63 closes the passage between the first port 9 and the second port 41. A resilient seal member 25 is provided on the first closure member 63 that is in contact with the seat 71 and that provides a fluid tight seal between the first closure member 63 and the seat 71. A spring member 73 that is arranged in the first passage 57 between the first closure member 63 and the separation wall 61 exerts a force on the first closure member 63 in the direction of arrow B. In the position of the closure body 11 shown in FIG. 3, the first passage 57 is closed, such that the venting path of the vehicle fuel system 1 as described herein above under reference to FIG. 1 for venting vapour to the atmosphere is closed. This position is referred to as the fuel system isolation position of the closure body.

By generating by means of the motor 15 a rotary motion in the direction of arrow C, the screw tread 19a of the screw member 19 engages the screw thread 21a of the nut member 21 and pushes the nut member 21 and thereby the closure body 11 in direction of arrow A. The closure body is thus pushed in direction of arrow A against the force that is exerted on the closure body in the direction of arrow B by the spring member 73. By exerting on the nut member 21 a force in the direction of arrow A that is greater than the force that is exerted on the closure body in the direction of arrow B by the spring member 73, the closure body 11 is translated in direction of arrow A and the first closure member 63 of the closure body 11 is moved away from the seat 71 in the direction of arrow A. Thus the closure body is positioned in a second position, wherein the first closure member 63 no longer closes the first passage 57, i.e. allows access to the first passage 57. Such a position is referred to as a fuel system venting position. As will be further described herein below under reference to FIGS. 4, 5, and 6, the embodiment of the module 49 shown in FIGS. 1 to 3 provides for multiple distinct fuel system venting positions.

Referring to FIG. 3, when starting from the fuel system isolation position of the closure body 11 shown in FIG. 3, a rotary motion is generated by means of the motor 15 in the direction of arrow D, the screw tread 19a of the screw member 19 engages the screw thread 21a of the nut member 21 and pushes the nut member 21 and thereby the closure body 11 in direction of arrow B. The first closure body 63 is thus forces against the seat 71, thereby compressing seal member 25. This results in the nut member 21 exerting a counter force on the screw member 19 against further translation of the nut member 21 and the closure body 11 in the direction of arrow B. In case the torque generated by the motor 15 is too low, the counter force stalls the motor 15 at a certain compression of the seal member 25. In case the torque generated by the motor 15 is high enough to overcome the counter force, the seal member 25 is further compressed. The screw tread 21a of the nut member 21 and the screw thread 19a of the screw member 19 are arranged such that at a certain compression of the seal member 25, the screw thread 21a of the nut member 21 reaches the end of the screw thread 19a of the screw member 19 and is disengaged from the end of the screw thread 19a of the screw member 19. Once the screw threat 21a of the nut member 21 is disengaged from the screw thread 19a of the screw member 19, the rotary output shaft 17 of the motor 15 can continue to rotate in the direction of arrow D, while the screw thread 21a of the nut member 21 rides the end of the screw thread 19a of the screw member 19. By subsequently reversing the direction of rotation of the rotary output shaft 17 of the motor 15 the screw thread 21a of the nut member 21 is re-engaged by the screw thread 19a of the screw member 19. Once the screw thread 21a of the nut member 21 is re-engaged by the screw thread 19a of the screw member 19, further rotation of the rotary shaft 17 in the direction of arrow C allows for translating the closure body 11 in the direction of arrow A in order to bring the closure body 11 in a fuel system venting position as described herein above.

Thus the screw mechanism illustrated in FIG. 3, provides a torque overload clutch that is configured to disconnect the motor 15 from the closure body 11 when the closure body 11 is in its fuel system isolation position shown in FIG. 3 and a rotary motion of the rotary output shaft 17 in the direction of arrow D is generated by the motor 15 at a certain torque level. This allows using the motor 15 for driving another member of the module 49 when the closure body 11 is in its fuel system isolation position.

FIG. 2 illustrates that a pump 13 is integrated in the housing 7. The pump 13 is configured for pumping fluid out of the first port 9 and while the closure body 11 is in its fuel system isolation position. The pump 13 is a positive displacement, rotary pump, in particular a vane pump, that comprises a driven pump member 23 and a one way pump valve 33. The housing 7 comprises a bypass 35 that communicates with the first port 9 and the second port 41. The bypass 35 bypasses the first closure member 63 of the closure body 11. The bypass 35 comprises a pump chamber 37 having arranged therein the driven pump member 23, a first bypass channel 75 via which the pump chamber 37 communicates with the first port 9, and a second bypass channel 39 via which the pump chamber 37 communicates with the second port 41.

The driven pump member 23 is directly driven by the motor 15, by being fixed to the rotary output shaft 17 of the rotary motor 15. When the closure body 11 is in the fuel system isolation position and a rotary motion of the rotary output shaft 17 is generated by the motor 15 in the direction of arrow D with a torque that is such that, as described herein above, the rotary output shaft 17 is disconnected from the closure body 11, the driven pump member 23 is rotated in the direction of arrow D. The driven pump member 23 is configured such that when rotated in the direction of arrow D with a certain speed while the closure body 11 is in the fuel system isolation position, the driven pump member 23 draws fluid out of the first port 9 via the first bypass channel 75 into the second port 41 via the second bypass channel 39 and the one way pump valve 33. This allows for depressurising the fuel system 1 of FIG. 1 via the first port 9.

FIGS. 4 to 6 illustrate different operation modes of the embodiment of the module 49 shown in FIGS. 1 to 3.

In FIG. 4 the closure body 11 is shown in a first fuel system venting position. In the shown first fuel system venting position, the first closure member 63 is positioned away from the seat 71 and allows access to the first passage 57, such that the first passage 57 between the first port 9 and the second port 41 is open. As shown, in the first fuel system venting position the second closure member 65 is positioned against a seat 77 in the second passage 59 thereby closing the second passage 59. A resilient seal member 79 is arranged between the seat 77 and the second closure body 65. In the shown position the fuel tank 3 is isolated from the filter unit 43 and isolated from the atmosphere. In the shown first fuel system venting position, the closure body 11 is thus also in a vehicle tank isolation position. In the first fuel system venting position/vehicle tank isolation position the filter unit 43 is not isolated from the atmosphere. From the shown first fuel system venting position/vehicle tank isolation position the closure body 11 can be translated in the direction of arrow B by generating a rotating motion of the screw member 19 in the direction of arrow D, in order to bring the closure body 11 in a second fuel system venting position that is illustrated by FIG. 5.

In the second fuel system venting position shown in FIG. 5, both the first passage 57 between the first port 9 and the second port 41, and the second passage 59 between the third port 51 and the fourth port 53 are open. From the shown second fuel system venting position the closure body 11 can be translated in the direction of arrow B by generating a rotating motion of the screw member 19 in the direction of arrow D, in order to bring the closure body 11 in the fuel system isolation position that is illustrated by FIG. 6 and that corresponds to the position illustrated by FIGS. 2 and 3.

In the fuel system isolation position of the closure body 11 shown in FIG. 6, the first passage 57 between the first port 9 and the second port 41 is closed, while the second passage 59 between the third port 51 and the fourth port 53 is open. As described herein above under reference to FIG. 3, from the shown fuel system isolation position of the closure body 11, the motor 15 can be used to drive the pump member 23 in order to pump fluid out of the first port 9, via the first bypass 75, the pump chamber 37, the second bypass 39 and the one-way pump valve 33 into the second port 41. This allows for evacuating the filter unit 43 of the fuel system 1 of FIG. 1 via the first port 9 and also for evacuating the fuel tank 3 via the filter unit 43 and the open second passage 59 of the module 49. From the shown fuel system isolation position the closure body 11 can be translated in the direction of arrow A by generating a rotating motion of the screw member 19 in the direction of arrow C, in order to bring the closure body 11 in the second fuel system venting position that is illustrated by FIG. 5 or the first fuel system venting position that is illustrated by FIG. 4.

Figure 7:
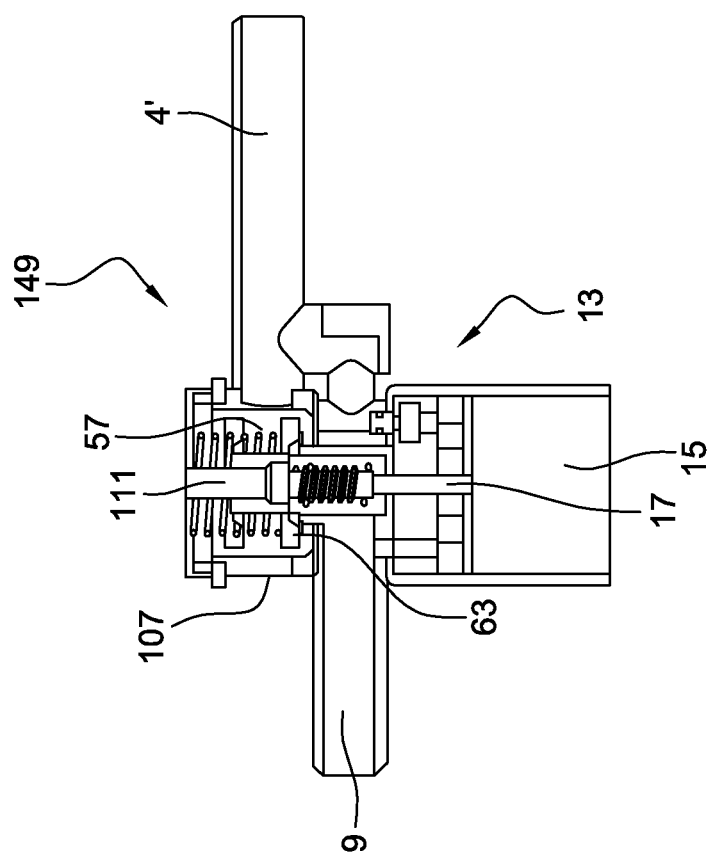

In FIG. 7 a second embodiment of a module of the invention is shown as an alternative for the module 49 shown in FIGS. 1 to 6. The module 149 shown as a second embodiment differs from the module 49 of the first embodiment, that its housing 107 does have the first port 9, the second port 41, and the first passage 57 between the first port 9 and the second port 41, but does not have the third port, the fourth port, and the second passage between the third port and the fourth port. The module 149 has a closure body 111 that corresponds to the closure body 11 of the first embodiment, albeit that the closure body 111 does not have the second closure member. The module 149 is further identical to the module 49. In particular, the module 149 is provided with a motor 15 for driving the closure member 111 and with a pump 13 that is integrated in the housing 107 and that is also driven by the motor 15. The first port 9 of the module 149 can for instance be connected to a tank vapour outlet of a vehicle tank, thereby allowing for isolating the vehicle tank from the atmosphere by means of the closure body 111 and for evacuating the vehicle tank by means of the pump 13.

Figure 8:
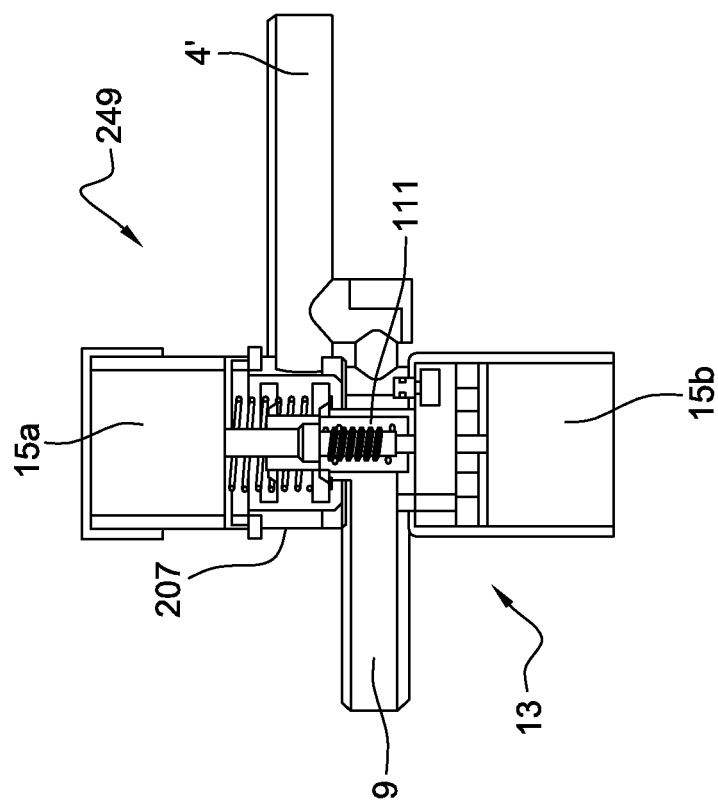
FIGS. 7 and 8 illustrate two alternative embodiments of the module of FIGS. 1, 2, and 3.

In FIG. 8 a third embodiment of a module of the invention is shown as an alternative for the module 149 shown in FIG. 7. The module 249 shown as a third embodiment differs from the module 149 of the second embodiment in that the module 249 has a first motor 15a for driving the closure body 111 and a second motor 15b for driving the pump 13 that is integrated in the housing 207. In this third embodiment, the screw mechanism is not required to provide for disconnecting the motor 15a from the closure body 111.

Figure 9:
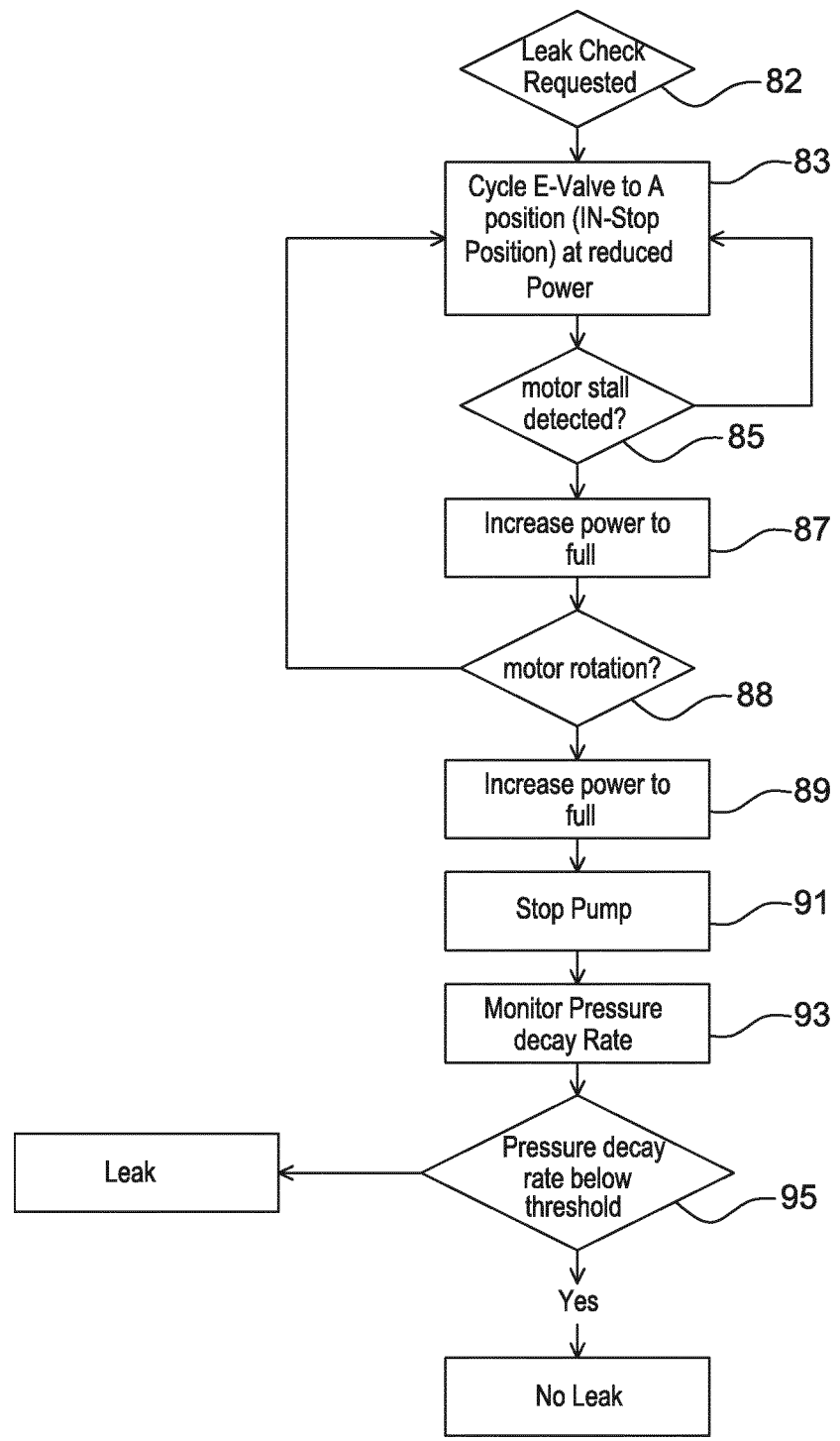
FIG. 9 illustrates an embodiment of a method for controlling the module of FIGS. 1, 2, 3, and 7.

FIG. 1 illustrates that the motor 15 of the module 49 is connected to a controller 27. The controller 27 is configured to control the motor 15. Connected to the controller 27 is a pressure sensor 81. The pressure sensor 81 is arranged and configured for measuring pressure in the fuel system 1. In the shown embodiment the pressure sensor 81 communicates with the first port 9, and is configured for measuring the pressure in the first port 9. The controller 27 can be used to perform a fuel system leak test by using the module 49. In FIG. 9 an embodiment is shown of a method for performing a fuel system leak test using the module 49. The controller 27 may be programmed to execute the steps of the method shown in FIG. 9.

The starting point for the method shown in FIG. 9 is the module 49 with the closing body 11 in a fuel system venting position, for instance the one shown in FIG. 4 or the one in FIG. 5. In the description of the method steps herein below, reference is made to FIGS. 3 to 6 and to the description thereto herein above.

When a request 82 for a fuel system leak test is received, the closure body 11 is in a first step 83 translated in the direction of arrow B by generating rotary motion of the rotary output shaft 17 of the motor 15 in the direction of arrow D by means of the motor 15 at reduced power. In particular with power that is reduced to the extent that the torque generated by the motor 15 is not enough to overcome the counter force exerted by the nut member 21 on the screw member 19 once the first closure member 63 of the closure body 11 comes into contact with the seat 71 and the seal member 25 is being compressed. As a result of translating the closure body 11 in the direction of arrow B at reduced power, at some moment, the motor 15 stalls as a result of not being above to overcome the counter force exerted by the nut member 21 on the screw member 19. Allowing the motor 15 to stall provides a simple way of determining when the closure body is in its fuel system isolation position. In particular when the motor 15 is a stepper motor, motor stall can easily be detected by using current trace for both the live and dead legs of the circuits. If the motor is stalling the current will spike on the live leg since there is no inductance. Likewise the dead leg when moving will have a current trace due to the inductance as it passes the magnets. When this trace disappears it can be determined that the motor had stopped. Thus providing a position sensor for determining when the closure body is in its fuel system isolation position is avoided. Alternatively, for determining motor stall a rotary speed sensor may be provided for measuring rotary speed of the motor. Instead of detecting motor stall for determining when the closure body is in its fuel system isolation position, a position sensor may be provided for measuring the position of the closure body and determining when the closure body is in its fuel system isolation position.

Once stalling of the motor 15 is detected in step 85, the power of the motor 15 is increased in step 87, thereby increasing the torque generated by the motor 15 in order to overcome the counter force exerted by the nut member 21 on the screw member 19. In case in step 88 rotation of the motor 15 is detected, the generation of rotary motion of the rotary output shaft 17 of the motor 15 in the direction of arrow D is continued, such that fuel system 1 is depressurized by means of the pump 13. At this step 89, the rotary speed of the motor output shaft 17 may be chosen such by controlling the motor 15 that the rotary speed of the rotary pump member 23 is most effective for pumping. During step 89 the pressure in the fuel system 1 is measured by means of the pressure sensor 81. Once a predetermined pressure has been reached, the motor 15 is stopped in step 91. Subsequently, in step 93, the pressure decay rate is monitored by measuring pressure by means of the pressure sensor 81 over time. On the basis of the monitoring of the pressure decay rate it is assessed in step 95 whether or not there is a leak in the fuel system.

In FIGS. 1 to 8 embodiments of the module of the invention are shown comprising a motor and a closure body actuator wherein the closure body actuator comprises a screw mechanism for converting rotary motion generated by the motor 15 into linear motion. Although the screw mechanism is particularly advantageous in that it allows for a simple clutch mechanism, the closure body actuator may alternatively include other known mechanisms for converting for converting rotary motion into linear motion.

In FIGS. 1 to 8 embodiments of the module of the invention are shown comprising a motor and a closure body actuator wherein the closure body actuator comprises a screw mechanism that is embodied such that it provides a torque overload clutch for disconnecting the motor from the closure body thereby allowing the motor to be used for driving the pump that is integrated in the housing. Although embodying a screw mechanism such that it provides a torque overload clutch for disconnecting the motor from the closure body is particularly advantageous in view of its simple design and in view of the fact that the clutch can be operated by controlling the motor, i.e. without an additional clutch actuator, other known clutch mechanisms for selectively disconnecting the closure body from the motor may be included as an alternative. Such clutch mechanisms may either act of the rotary motion part of the closure body actuator or on the linear motion part of the actuator. Furthermore, such clutch mechanisms may either include a mechanism that allows operation of the clutch mechanism by controlling the motor or include a mechanism, such as a clutch actuator, for operating the clutch.

In FIGS. 1 to 8 embodiments of the module of the invention are shown comprising a pump integrated in the housing that is a rotary pump, in particular a vane pump. Alternatively, the pump can be a linear pump, in particular a linear piston pump. Such a linear pump can be driven by a mechanism that converts rotary motion generated by the motor into linear motion of the pump member of the linear pump such as a pump piston. Such a mechanism is for instance a crank mechanism.

In FIGS. 1 to 8 embodiments of the module of the invention are shown comprising a closure body that is guided in the housing for being translated between a fuel system venting position and the fuel system isolation position. Alternatively, a closure body may be provided that is guided in the housing for being rotated instead of translated between a fuel system venting position and the fuel system isolation position. In such alternative embodiment the closure body actuator configured for converting rotary motion generated by the motor into linear motion is not required.

Whilst the principles of the invention have been set out above in connection with specific embodiments, it is to be understood that this description is merely made by way of example and not as a limitation of the scope of protection which is determined by the appended claims.

The invention claimed is:

1. A module for use in a vehicle fuel system, said module comprising:
    a housing having:
        a first port;
        a second port; and
        a passage between the first port and the second port;
    a closure body that is moveably arranged in said housing;
        wherein said closure body is configured for closing the passage between the first port and the second port in a first position of the closure body and for allowing access to the passage in a second position of the closure body; and a pump that is integrated in said housing, wherein said pump communicates with the first port and is configured for pumping fluid into or out of the first port while the closure body is in the first position, wherein the module further comprises a motor and a closure body actuator configured for positioning the closure body in at least the first position and the second position, wherein said closure body actuator is driven by said motor, and said motor is configured for driving the pump while the closure body is in the first position, wherein the closure body actuator comprises a clutch configured for connecting the motor to and disconnecting the motor from the closure body.

2. The module according to claim 1, wherein
the housing has
a third port;
a fourth port; and
a second passage between the third port and the fourth port;
wherein
the closure body is configured for closing the second passage between the third port and the fourth port in a third position of the closure body and for allowing access to the second passage between the third port and the fourth port in the first position of the closure body.

3. The vehicle fuel system according to claim 2, further comprising:
a vehicle tank having a tank vapour outlet; and
a vapour recovery system having a vapour recovery inlet and a vapour recovery outlet,
wherein
the housing has
a third port that communicates with the tank vapour outlet;
a fourth port that communicates with the vapour recovery inlet; and
a second passage between the third port and the fourth port;
wherein
the vapour recovery outlet is in communication with the first port as the fuel system vapour outlet;
the closure body is configured for closing the second passage between the third port and the fourth port in a vehicle tank isolation position of the closure body and for allowing access to the second passage between the third port and the fourth port in the fuel system venting position of the closure body.

4. A vehicle fuel system, comprising:
a fuel system vapour outlet;
a module according to claim 1 wherein:
the first port of the housing communicates with the fuel system vapour outlet;
the second port of the housing communicates with the atmosphere; wherein the first position of the closure body is a fuel system isolation position of the closure body and the second position of the closure body is a fuel system venting position of the closure body; and
the pump is configured for pressurizing or depressurizing the fuel system via the fuel system vapour outlet while the closure body is in its fuel system isolation position.

5. The vehicle fuel system according to claim 4, wherein the motor is a rotary motor.

6. The vehicle fuel system according to claim 5, wherein the closure body is guided in the housing for being translated (A, B) between the fuel system venting position and the fuel system isolation position, and wherein the closure body actuator is configured to convert a rotational motion (C, D) generated by the rotary motor in a linear motion (A, B) for translating the closure body.

7. The vehicle fuel system according to claim 6, wherein the closure body actuator comprises a screw mechanism for converting the rotational motion (C, D) generated by the rotary motor in the linear motion (A,B).

8. The vehicle fuel system according to claim 7, wherein the screw mechanism comprises a screw member driven by the motor and a nut member provided on the closure body, wherein the screw mechanism provides the torque overload clutch by being configured such that in the fuel system isolation position of the closure body an end of a screw thread of the nut member is at an end of a screw thread of the screw member such that rotation of the screw member in a first direction of rotation (D) relative to the nut member results in the screw thread of the nut member being disconnected from the screw thread of the screw member and rotation of the screw member in a second direction of rotation (C) relative to the nut member results in the screw thread of the nut member being connected to the screw thread of the screw member.

9. The vehicle fuel system according to claim 8, wherein a resilient seal member is provided on the housing or the closure body that is compressed between the housing and the closure body when the closure body is in the fuel system isolation position and the screw member is rotated in the first direction of rotation (D).

10. The vehicle fuel system according to claim 4, comprising a controller configured to control the motor, wherein the controller is configured to control the motor to generate a rotational motion at a first power level when the closure body is moved between the fuel system venting position and the fuel system isolation position and at a second power level for driving the pump while the closure body is in the fuel system isolation position.

11. The vehicle fuel system according to claim 4, wherein the pump is a rotary pump.

12. The vehicle fuel system according to claim 4, wherein the pump comprises a driven pump member and a one way pump valve.

13. The vehicle fuel system according to claim 12, wherein the housing comprises a bypass that communicates with the first port and the second port and that bypasses the closure body, wherein the bypass communicates with the pump member and is provided with the one way pump valve.

14. The vehicle fuel system according to claim 13, wherein the bypass comprises a pump chamber having arranged therein the driven pump member, and a bypass channel having arranged therein the one way pump valve.

15. The vehicle fuel system according to claim 4, wherein the motor is configured to drive both the closure body actuator and the pump.

16. The vehicle fuel system according to claim 15, wherein the motor is configured to drive in such a manner that the closure body actuator and the pump are not driven at the same time.

17. The vehicle fuel system according to claim 4, wherein the motor is a stepper motor.

18. The vehicle fuel system according to claim 4, further comprising:
a vehicle tank having a tank vapour outlet; and a vapour recovery system having a vapour recovery inlet and a vapour recovery outlet, wherein the housing has
- a third port that communicates with the tank vapour outlet;
- a fourth port that communicates with the vapour recovery inlet; and
- a second passage between the third port and the fourth port;

wherein the vapour recovery outlet is in communication with the first port as the fuel system vapour outlet;

the closure body is configured for closing the second passage between the third port and the fourth port in a vehicle tank isolation position of the closure body and for allowing access to the second passage between the third port and the fourth port in the fuel system venting position of the closure body.

19. The vehicle fuel system according to claim 1, wherein said clutch is a torque overload clutch.

* * * * *